United States Patent [19]

Stoliker

[11] 3,879,535

[45] Apr. 22, 1975

[54] ANESTHETIC COMPOSITIONS AND METHODS OF USE

[75] Inventor: Harry E. Stoliker, Orefield, Pa.

[73] Assignee: Parke, Davis & Company, Detroit, Mich.

[22] Filed: Jan. 17, 1974

[21] Appl. No.: 433,987

Related U.S. Application Data

[63] Continuation-in-part of Ser. No. 334,128, Feb. 20, 1973, abandoned, which is a continuation of Ser. No. 137,088, March 23, 1971, abandoned.

[52] U.S. Cl............................... 424/273; 424/275
[51] Int. Cl............................................. A61k 27/00
[58] Field of Search............................ 424/273, 275

[56] References Cited
UNITED STATES PATENTS

| | | | |
|---|---|---|---|
| 3,522,273 | 7/1970 | Parcell | 260/332.3 |
| 3,558,605 | 1/1971 | De Wald et al. | 260/239.3 |

OTHER PUBLICATIONS

Wilson & Grisvold, "Text of Organic Medical & Pharmaceutical Chemistry," 4th Ed., pp. 330–331, (1962).

*Primary Examiner*—Albert T. Meyers
*Assistant Examiner*—Leonard Schenkman

[57] ABSTRACT

Pharmaceutical compositions for anesthetic use comprising one part by weight of 2-(ethylamino)-2-(2-thienyl)cyclohexanone in combination with 0.1 to 10 parts by weight of 4-(o-fluorophenyl)-6,8-dihydro-1,3,8-trimethyl-pyrazolo[3,4-e][1,4]diazepin-7(1H)-one. Methods for the induction of anesthesia in mammals by parenterally administering 2-(ethylamino)-2-(2-thienyl)cyclohexanone in combination with 4-(o-fluorophenyl)-6,8-dihydro-1,3,8-trimethylpyrazolo[3,4-e][1,4]diazepin-7(1H)-one in the proportions indicated above. In the compositions and methods of the invention the substances can be used in either free base or acid-addition salt form.

10 Claims, No Drawings

ANESTHETIC COMPOSITIONS AND METHODS OF USE

This Application is a Continuation-in-Part Application of Application Ser. No. 334,128, filed Feb. 20, 1973, now abandoned which is a Continuation of Application Ser. No. 137,088, filed Apr. 23, 1971, now abandoned.

SUMMARY AND DETAILED DESCRIPTION

The present invention relates to new pharmaceutical compositions with improved anesthetic activity, and to methods for the induction of anesthesia.

More particularly, the invention relates to pharmaceutical compositions comprising 2-(ethylamino)-2-(2-thienyl)cyclohexanone in combination with 4-(o-fluorophenyl)-6,8-dihydro-1,3,8-trimethylpyrazolo[3,4-e][1,4]-diazepin-7(1H)-one in specified proportions, and to methods for the induction of anesthesia in mammals by the parenteral administration of 2-(ethylamino)-2-(2-thienyl)cyclohexanone in combination with 4-(o-fluorophenyl)-6,8-dihydro-1,3,8-trimethylpyrazolo[3,4-e][1,4]diazepin-7(1H)-one in specified proportions.

2-(Ethylamino)-2-(2-thienyl)cyclohexanone and its acid-addition salts are described in U.S. Pat. No. 3,522,273 and are already known as anesthetic agents.

4-(o-Fluorophenyl)-6,8-dihydro-1,3,8-trimethylpyrazolo[3,4-e][1,4]diazepin-7(1H)-one, a compound of the formula

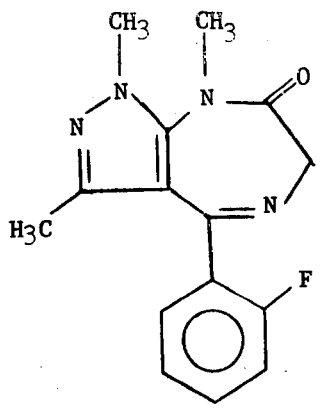

and its acid-addition salts are described in U.S. Pat. No. 3,558,605 and are already known as central nervous system depressants.

Thus, the compositions and methods of the invention are based in part on the use of a substance which is already known as an anesthetic agent. However in some instances and in some species of mammals, 2-(ethylamino)-2-(2-thienyl)cyclohexanone when used alone does not produce a completely satisfactory state of anesthesia, this is especially true in dogs. In such cases, the compositions and methods of the invention produce an improved quality of anesthesia when compared with the separate effects of the components and with the effects that could have been predicted for combinations according to the existing knowledge in the art.

More specifically, 2-(ethylamino)-2-(2-thienyl)cyclohexanone, when used as an anesthetic, causes severe convulsions in certain species, especially dogs; however, when employing the combination at levels which produce satisfactory anesthesia, convulsions are rarely reported. Of even greater significance is the fact that less anesthetic, that is 2-(ethylamino)-2-(2-thienyl)cyclohexanone, is required to produce the desired level of anesthesia when employing the combination disclosed in this invention. Thus one can use less 2-(ethylamino)-2-(2-thienyl)cyclohexanone to achieve a desired anesthetic level. In the alternative, one may maintain the quantity of 2-(ethylamino)-2-(2-thienyl)cyclohexanone and achieve a greater anesthetic effect.

The following gives the procedure and results obtained when comparing the anesthetic effect of 2-(ethylamino)-2-(2-thienyl)cyclohexanone hydrochloride (A) alone, 4-(o-fluorophenyl)-6,8-dihydro-1,3,8-trimethylpyrazolo[3,4-e][1,4]diazepin-7(1H)-one hydrochloride alone (B) and mixtures of said compounds (A+B).

Adult cats of mixed breeds and both sexes were used, which were housed singly in ample cages between uses.

The individual components and the combination of the components (A+B) were dissolved in deionized water at concentrations which would deliver the appropriate dose when 0.4 ml. was given to cats/kg. of body weight. The compounds were administered by the intramuscular route into the gluteal area. They were administered as hydrochloride salts but the doses are given as free base equivalents.

In this study, attention was directed to the duration of the various obvious phases of cataleptoid-anesthesia and to the quality of the effects produced.

The phases of cataleptoid-anesthesia are defined as:
1. Induction: Time from administration to loss of righting ability.
2. Cataleptoid-anesthesia: From loss of righting ability until animal first lifts head from floor.
3. Surgical anesthesia: That portion of the cataleptoid-anesthetic phase during which the animal fails to show outward manifestations (limb withdrawal, shoulder twitching, blinking, or vocalization) in response to a strong nociceptive stimulus.
4. Emergence: From head lift to standing position.
5. Recovery: Time from standing until completely normal.

The quality of the anesthetic state was judged from observations obtained by palpation and manipulation of abdominal muscles and the limbs, as well as from the responses of the animal to pressure applied to the toe pads of the limbs.

In this study, at least 1 week separated reuse of each cat. Various dose ratios were compared for duration of cataleptoid-anesthetic effect and duration of emergence. Observations were made on the occurrence of satisfactory analgesia, satisfactory relaxation of abdominal muscles, satisfactory relaxation of limb muscles, and the numbers of animals judged to be satisfactory for surgical operation 10 to 20 minutes after dosing. In most cases, the addition of increasing amounts of Component B to a fixed amount of Component A increased the duration of cataleptoid-anesthetic effect and the duration of emergence. The observations on the occurrence of satisfactory analgesia, satisfactory relaxation of abdominal muscles, satisfactory relaxation of limb muscles, and numbers of animals judged to be satisfactory for surgical operation 10 to 20 minutes after dosing are given in the following table.

|  | Dosage, Mg./Kg. A | Dosage, Mg./Kg. B | Satisfactory Analgesia | Satisfactory Relaxation of Abdominal Muscles | Satisfactory Relaxation of Limb Muscles | Observer Judgment On Operability at 10–20 Mins. After Dosing |
|---|---|---|---|---|---|---|
| 1. | 5.0 | 0 | 1/5 | 0/5 | 0/5 | 0/5 |
| 2. | 5.0 | 1.0 | 2/5 | 2/5 | 3/5 | 2/5 |
| 3. | 5.0 | 2.5 | 2/5 | 3/5 | 3/5 | 2/5 |
| 4. | 5.0 | 5.0 | 3/5 | 4/5 | 5/5 | 3/5 |
| 5. | 5.0 | 10.0 | 4/5 | 5/5 | 5/5 | 4/5 |
| 6. | 10.0 | 0 | 0/5 | 0/5 | 0/5 | 0/5 |
| 7. | 10.0 | 2.5 | 4/6 | 6/6 | 6/6 | 4/6 |
| 8. | 10.0 | 5.0 | 8/10 | 10/10 | 10/10 | 9/10 |
| 9. | 10.0 | 10.0 | 8/10 | 10/10 | 10/10 | 10/10 |
| 10. | 0 | 1 | 0/5 | 0/5 | 0/5 | 0/5 |
| 11. | 0 | 5 | 0/5 | 0/5 | 0/5 | 0/5 |
| 12. | 0 | 10 | 0/5 | 0/5 | 0/5 | 0/5 |

In addition to the results given in the above table, the following observations were made. Adverse side effects were noticed only in cats receiving Component A alone which included muscular rigidity, myoclonus (in 3/5 cats receiving 10 mg./kg. of Thienyl), and watery salivation, and Component B alone which included excitement and ataxia. With any combination using 2.5 mg./kg. or more of Component B, salivation was at a minimum. When present, it occurred during the emergence phase. There was no incidence of emesis in this study.

According to the invention, the new pharmaceutical compositions of the invention are produced by combining one part by weight of 2-(ethylamino)-2-(2-thienyl)-cyclohexanone with 0.1 to 10 parts by weight of 4-(o-fluorophenyl)-6,8-dihydro-1,3,8-trimethyl-pyrazolo[3,4-e][1,4]diazepin-7(1H)-one preferably .33 to 3 parts by weight, in a form suitable for parenteral administration. Each ingredient indicated above can be used in the form of its free base or in the form of an acid-addition salt. Some representative examples of pharmaceutically-acceptable acid-addition salts are the hydrochloride, hydrobromide, sulfate, phosphate, citrate, succinate, maleate, acetate, benzoate, and pamoate. The compositions can be formulated as a dry mixture containing only the active ingredients in a form suitable for constitution with a liquid medium into a parenteral dosage form. Alternatively, the compositions can be formulated to contain one or more pharmaceutically-acceptable solid or liquid carriers or diluents. Typically the compositions are provided in aqueous solutions or in solid form intended for reconstitution into aqueous solutions. However, other solvent media such as glycerine, propylene glycol, or vegetable oils can be used in place of or in addition to water. A preservative such as benzethonium chloride is customarily added as well as, if desired, other formulating agents conventional in the pharmaceutical art. The compositions of the invention can also contain one or more additional anesthetic agents or other pharmaceutical agents. As used herein, the term "suitable for parenteral administration" is defined to include freeze-dried formulations and other dry mixtures which are intended to be constituted or reconstituted into a solution or suspension for injection by conventional addition of water or other liquid medium, generally at the time of use.

For practical purposes, the total quantity of active ingredients in the compositions of the invention can vary from approximately 0.5% to 100% by weight. The lower concentrations are present in parenteral solutions or suspensions already formulated and immediately ready for use; whereas the higher concentrations are present in dry mixtures including freeze-dried formulations suitable for parenteral administration following conventional reconstitution with water or other liquid medium. The preferred compositions are those having the proportion of one part by weight of 2-(ethylamino)-2-(2-thienyl)cyclohexanone and 0.33 to 3 parts by weight of 4-(o-fluorophenyl)-6,8-dihydro-1,3,8-trimethylpyrazolo[3,4-e][1,4]diazepin-7-(1H)-one, and in which those active ingredients together constitute more than 50% by weight of the composition in the case of a dry mixture or freeze-dried formulation, or less than 50% by weight of the composition in the case of a primarily liquid composition such as a solution or suspension. In all cases herein, the proportions by weight (and, except where otherwise indicated, the amounts) are stated in terms of free base equivalents. However, either the free base or an equivalent amount of a pharmaceutically-acceptable acid-addition salt can be used in preparing a composition.

Also in accordance with the invention, the aforementioned compositions can be provided in dosage unit form suitable for parenteral administration. For this purpose the compositions are normally provided in ampoules or vials containing either one or a plurality of individual dosages. The composition can be present in the form of an aqueous or non-aqueous solution or suspension for parenteral administration; or in the form of a dry mixture or freeze-dried formulation to be constituted into such a solution or suspension by conventional addition of an aqueous or non-aqueous medium. A solution or suspension as provided or as reconstituted preferably contains from about 2.5 mg. per ml. to about 250 mg. per ml. of 2-(ethylamino)-2-(2-thienyl)-cyclohexanone and a quantity of 4-(o-fluorophenyl)-6,8-dihydro-1,3,8-trimethylpyrazolo[3,4-e][1,4]diazepin-7(1H)-one to give a ratio within the range specified above.

According to the methods of the invention, an anesthetically-effective quantity of 2-(ethylamino)-2-(2-thienyl)cyclohexanone in combination with 4-(o-fluorophenyl)-6,8-dihydro-1,3,8-trimethyl-pyrazolo[3,4-e][1,4]diazepin-7(1H)-one are administered parenterally to mammals for the induction of anesthesia. The proportions used are one part by weight of 2-(ethylamino)-2-(2-thienyl)cyclohexanone and 0.1 to 10 parts by weight (preferably 0.33 to 3 parts by weight) of 4-(o-fluorophenyl)-6,8-dihydro-1,3,8-trimethylpyrazolo[3,4-e]-[1,4]diazepin-7(1H)-one.

The proportions by weight (and, except where otherwise indicated, the amounts) are stated in terms of free base equivalents. However, either the free base or an equivalent amount of a pharmaceutically-acceptable acid-addition salt can be used. The usual routes of administration are by intravenous injection or intramuscular injection. The dosages are selected according to the desired depth and duration of anesthesia and the particular species of mammal involved. In general, an initial dose corresponding to at least 0.5 mg. of 2-(ethylamino)-2-(2-thienyl)cyclohexanone or per kg. body weight is given. A preferred initial dosage by the intravenous route is one corresponding to 2 to 2.5 mg. of 2-(ethylamino)-2-(2-thienyl)cyclohexanone per kg. body weight in the case of large mammals and from 20 to 25 mg. of 2-(ethylamino)-2-(2-thienyl)cyclohexanone per kg. body weight in the case of small mammals. In each case, the quantity of 4-(o-fluorophenyl)-6,8-dihydro-1,3,8-trimethylpyrazolo[3,4-e][1,4]diazepin-7(1H)-one administered in combination conforms to the range of ratios as indicated above. The precise dosage to be administered must be determined on the basis of the species of mammal and the anesthetic requirement; however, somewhat larger dosages are required for intramuscular administration as opposed to intravenous administration, for example two to four times the quantities indicated above. When anesthesia of comparatively short duration is desired, a single dosage is administered. When a longer duration of anesthesia is desired, one or more additional dosages can be administered as the surgery or other procedure is continued. It is also satisfactory to induce anesthesia as described herein and maintain the anesthesia with other anesthetic agents.

The new compositions and methods of the invention produced improved results in the induction and maintenance of anesthesia in mammals. They can be used, for example, in cats, dogs, swine, horses, and cattle, as well as in humans. Compared with 2-(ethylamino)-2-(2-thienyl)cyclohexanone alone, they produce an improved quality of anesthesia and a more satisfactory recovery period. The compositions and methods of the invention produce anesthesia with decreased spasticity and improved relaxation of abdominal muscles and limb muscles. The emergence period or recovery period is a proportionately shorter portion of the total drug effect and the incidences of convulsions, vocalization, myoclonus, and athetoid movements are decreased. An increased degree of analgesia is also observed.

The invention is illustrated by the following examples.

EXAMPLE 1

| Ingredient | Quantity |
| --- | --- |
| 4-(o-Fluorophenyl)-6,8-dihydro-1,3,8-trimethylpyrazolo-[3,4-e][1,4]diazepin-7(1H)-one | 2000 g. |
| Citric acid, anhydrous | 1480 g. |
| 2-(Ethylamino)-2-(2-thienyl)-cyclohexanone hydrochloride | 4660 g. |
| Benzethonium chloride | 2 g. |
| 4% (weight/volume) Aqueous solution of citric acid, to make pH 3–4 | |
| Water for injection, to make 20 liters | |

The 4-(o-fluorophenyl)-6,8-dihydro-1,3,8-trimethylpyrazolo[3,4-e][1,4]diazepin-7(1H)-one and the citric acid are dissolved with stirring in a small amount of warm water and the 2-(ethylamino)-2-(2-thienyl)cyclohexanone hydrochloride is added with sufficient water to give a total volume of 19.5 liters. The mixture is stirred and warmed until solution is complete following which the benzethonium chloride is added and dissolved by stirring. The solution is adjusted to pH 3-4, if necessary, with the citric acid solution, and sufficient water is added to give a final volume of 20 liters. The solution is sterilized by filtering it through a sterile filter membrane, 0.22 micron pore size. The filtrate is collected in a sterile receiving vessel and aseptically filled in 2 ml. portions into glass ampoules, which are then sealed. Yield equals approximately 10,000 ampoules. The product is a solution suitable for parenteral administration, containing 200 mg. of 2-(ethylamino)-2-(2-thienyl)cyclohexanone (free base equivalent) and 100 mg. of 4-(o-fluorophenyl)-6,8-dihydro-1,3,8-trimethylpyrazolo[3,4-e][1,4]diazepin-7(1H)-one (free base equivalent) per ml.

By the foregoing procedure, with the substitution of 3490 g. of 2-(ethylamino)-2-(2-thienyl)cyclohexanone hydrochloride for the 4660 g. of 2-(ethylamino-2-(2-thienyl)-cyclohexanone hydrochloride, the final solution contains 150 mg. of 2-(ethylamino)-2-(2-thienyl)-cyclohexanone (free base equivalent) and 100 mg. of 4-(o-fluorophenyl)-6,8-dihydro-1,3,8-trimethyl-pyrazolo[3,4-e][1,4]diazepin-7(1H)-one (free base equivalent) per ml.

By the foregoing procedure, with the substitution of 2,330 g. of 2-(ethylamino)-2-(2-thienyl)cyclohexanone hydrochloride for the 4660 g. of 2-(ethylamino)-2-(2-thienyl)-cyclohexanone hydrochloride, the final solution contains 100 mg. of 2-(ethylamino)-2-(2-thienyl)cyclohexanone (free base equivalent) and 100 mg. of 4-(o-fluorophenyl)-6,8-dihydro-1,3,8-trimethyl-pyrazolo[3,4-e][1,4]diazepin-7(1H)-one (free base equivalent) per ml.

EXAMPLE 2

| Ingredient | Quantity |
| --- | --- |
| 2-(Ethylamino)-2-(2-thienyl)-cyclohexanone hydrochloride | 2330 g. |
| 4-(o-Fluorophenyl)-6,8-dihydro-1,3,8-trimethylpyrazolo-[3,4-e][1,4]diazepin-7(1H)-one hydrochloride | 1120 g. |
| Benzethonium chloride | 2 g. |
| 4% (weight/volume) Aqueous solution of citric acid, to make pH 3–4 | |
| Water for injection, to make 20 liters | |

The 2-(ethylamino)-2-(2-thienyl)cyclohexanone hydrochloride and the 4-(o-fluorophenyl)-6,8-dihydro-1,3,8-trimethylpyrazolo[3,4-e][1,4]diazepin-7(1H)-one hydrochloride are dissolved in 16 liters of water. The benzethonium chloride is then added and dissolved by stirring. The solution is adjusted to pH 3-4, if necessary, with citric acid solution and sufficient water is added to give a final volume of 20 liters. The solution is sterilized by filtering it through a sterile filter membrane, 0.22 micron pore size. The filtrate is collected in a sterile receiving vessel and aseptically filled in 2 ml. portions into glass ampoules, which are then sealed. Yield equals approximately 10,000 ampoules. The product is a solution suitable for parenteral administration, containing 100 mg. of 2-(ethylamino)-2-(2-thienyl)-cyclohexanone (free base equivalent) and 50 mg. of 4-(o-fluorophenyl)-6,8-dihydro-1,3,8-trimethylpyrazolo[3,4-e]-[1,4]diazepin--7(1H)-one (free base equivalent) per ml.

By the foregoing procedure, but using only 1750 g. of 2-(ethylamino)-2-(2-thienyl)cyclohexanone hydrochloride, the final solution contains 75 mg. of 2-(ethylamino)-2-(2-thienyl)cyclohexanone (free base equivalent) and 50 mg. of 4-(o-fluorophenyl)-6,8-dihydro-1,3,8-trimethylpyrazolo-[3,4-e][1,4]diazepin-7(1H)-one (free base equivalent) per ml.

By the foregoing procedure, but using only 1160 g. of 2-(ethylamino)-2-(2-thienyl)cyclohexanone hydrochloride, the final solution contains 50 mg. of 2-(ethylamino)-2-(2-thienyl)cyclohexanone (free base equivalent) and 50 mg. of 4-(o-fluorophenyl)-6,8-dihydro-1,3,8-trimethylpyrazolo[3,4-e][1,4]diazepin-7(1H)-one (free base equivalent) per ml.

The starting material required in the above formulations can be obtained as follows. A hot solution of 11.2 g. of 4-(o-fluorophenyl)-6,8-dihydro-1,3,8-trimethylpyrazolo[3,4-e][1,4]diazepin-7(1H)-one in 80 ml. of isopropyl alcohol is treated with 9 ml. of a solution of hydrogen chloride in isopropyl alcohol (having a concentration of 2 g. of hydrogen chloride per 10 ml of solution). The mixture is diluted with 120 ml. of ethyl acetate and chilled. The insoluble product is collected on a filter and washed with ethyl acetate and with ether. It is 4-(o-fluorophenyl)-6,8-dihydro-1,3,8-trimethylpyrazolo[3,4-e][1,4]diazepin-7(1H)-one hydrochloride; m.p. 247°–249° C. with decomposition.

EXAMPLE 3

| Ingredient | Quantity |
| --- | --- |
| 2-(Ethylamino)-2-(2-thienyl)-cyclohexanone hydrochloride | 1160 g. |
| 4-(o-Fluorophenyl)-6,8-dihydro-1,3,8-trimethylpyrazolo-[3,4-e][1,4]diazepin-7(1H)-one hydrochloride | 562 g. |
| Benzethonium chloride | 2 g. |
| 4% (weight/volume) Aqueous solution of citric acid, to make pH 3–4 | |
| Water for injection, to make 20 liters | |

The procedure of Example 2 is followed. Yield equals approximately 10,000 ampoules. The product is a solution suitable for parenteral administration, containing 50 mg. of 2-(ethylamino)-2-(2-thienyl)cyclohexanone (free base equivalent) and 25 mg. of 4-(o-fluorophenyl)-6,8-dihydro-1,3,8-trimethylpyrazolo[3,4-e][1,4]diazepin-7(1H)-one (free base equivalent) per ml.

By the foregoing procedure, but using only 580 g. of 2-(ethylamino)-2-(2-thienyl)cyclohexanone hydrochloride, the final solution contains 25 mg. of 2-(ethylamino)-2-(2-thienyl)cyclohexanone (free base equivalent) and 25 mg. of 4-(o-fluorophenyl)-6,8-dihydro-1,3,8-trimethylpyrazolo[3,4-e][1,4]diazepin-7(1H)-one (free base equivalent) per ml.

EXAMPLE 4

| Ingredient | Quantity |
| --- | --- |
| 2-(Ethylamino)-2-(2-thienyl)-cyclohexanone hydrochloride | 233 g. |
| 4-(o-Fluorophenyl)-6,8-dihydro-1,3,8-trimethylpyrazolo-[3,4-e][1,4]diazepin-7(1H)-one hydrochloride | 112 g. |
| Benzethonium chloride | 2 g. |
| 4% (weight/volume) Aqueous solution of citric acid, to make pH 3–4 | |
| Water for injection, to make 20 liters | |

The procedure of Example 2 is followed. Yield equals approximately 10,000 ampoules. The product is a solution suitable for parenteral administration, containing 10 mg. of 2-(ethylamino)-2-(2-thienyl)cyclohexanone (free base equivalent) and 5 mg. of 4-(o-fluorophenyl)-6,8-dihydro-1,3,8-trimethylpyrazolo[3,4-e][1,4]diazepin-7(1H)-one (free base equivalent) per ml.

By the foregoing procedure, but using only 116 g. of 2-(ethylamino)-2-(2-thienyl)cyclohexanone hydrochloride and increasing the amount of 4-(o-fluorophenyl)-6,8-dihydro-1,3,8-trimethylpyrazolo[3,4-e][1,4]diazepin-7(1H)-one hydrochloride to 224 g., the final solution contains 5 mg. of 2-(ethylamino)-2-(2-thienyl)cyclohexanone (free base equivalent) and 10 mg. of 4-(o-fluorophenyl)-6,8-dihydro-1,3,8-trimethylpyrazolo[3,4-e][1,4]diazepin-7(1H)-one (free base equivalent) per ml.

EXAMPLE 5

| Ingredient | Quantity |
| --- | --- |
| 4-(o-Fluorophenyl)-6,8-dihydro-1,3,8-trimethylpyrazolo-[3,4-e][1,4]diazepin-7(1H)-one | 5000 g. |
| Citric acid, anhydrous | 3700 g. |
| 2-(Ethylamino)-2-(2-thienyl)-cyclohexanone hydrochloride | 5820 g. |
| Benzethonium chloride | 20 g. |
| Aminoacetic acid | 250 g. |
| 4% (weight/volume) Aqueous solution of citric acid, to make pH 3–4 | |
| Water for injection, to make 50 liters | |

The 4-(o-fluorophenyl)-6,8-dihydro-1,3,8-trimethylpyrazolo[3,4-e][1,4]diazepin-7(1H)-one and the citric acid are dissolved with stirring in a small amount of warm water and the 2-(ethylamino)-2-(2-thienyl)cyclohexanone hydrochloride is added with sufficient water to give a total volume of 49 liters. The mixture is stirred and warmed until solution is complete, following which the benzethonium chloride and aminoacetic acid are added separately and dissolved. The solution is adjusted to pH 3–4, if necessary, with citric acid solution and sufficient water is added to give a final volume of 50 liters. The solution is sterilized by filtering it through a sterile filter membrane, 0.22 micron pore size. The filtrate is aseptically filled in 5 ml. portions into glass vials having a capacity of 20 ml. which are then covered with sterile rubber stoppers suitable for use in freeze-drying operations. The solution in each vial is freeze-dried and the vials are sealed with aluminum seals. Yield equals approximately 10,000 vials. The product is a freeze-dried formulation. For use as a solution for parenteral administration, each vial is reconstituted with water for injection, to a volume of 20 ml. The reconstituted solution contains 25 mg. of 2-(ethylamino)-2-(2-thienyl)cyclohexanone (free base equivalent) and 25 mg. of 4-(o-fluorophenyl)-6,8-dihydro-1,3,8-trimethylpyrazolo[3,4-e][1,4]-diazepin- 7(1H)-one (free base equivalent) per ml. If desired, a parenteral solution having different concentrations of active ingredients is obtained by reconsituting the freeze-dried formulation with any desired amount of water.

EXAMPLE 6

| Ingredient | Quantity |
| --- | --- |
| 4-(o-Fluorophenyl)-6,8-dihydro-1,3,8-trimethylpyrazolo-[3,4-e][1,4]diazepin-7(1H)-one | 1000 g. |
| Citric acid, anhydrous | 740 g. |
| 2-(Ethylamino)-2-(2-thienyl)-cyclohexanone hydrochloride | 580 g. |
| Benzethonium chloride | 10 g. |
| Aminoacetic acid | 300 g. |
| 4% (weight/volume) Aqueous solution of citric acid, to make pH 3-4 | |
| Water for injection, to make 30 liters | |

The 4-(o-fluorophenyl)-6,8-dihydro-1,3,8-trimethylpyrazolo[3,4-e][1,4]diazepin-7(1H)-one and the citric acid are dissolved with stirring in a small amount of warm water and the 2-(ethylamino)-2-(2-thienyl)cyclohexanone hydrochloride is added with sufficient water to give a total volume of 29 liters. The mixture is stirred and warmed until solution is complete, following which the benzethonium chloride and aminoacetic acid are added separately and dissolved. The solution is adjusted to pH 3-4, if necessary, with citric acid solution and sufficient water is added to give a final volume of 30 liters. The solution is sterilized by filtering it through a sterile filter membrane, 0.22 micron pore size. The filtrate is aseptically filled in 3 ml. portions into glass vials having a capacity of 10 ml. which are then covered with sterile rubber stoppers suitable for use in freeze-drying operations. The solution in each vial is freeze-dried and the vials are sealed with aluminum seals. Yield equals approximately 10,000 vials. The product is a freeze-dried formulation. For use as a solution for parenteral administration, each vial is reconstituted with water for injection, to a volume of 10 ml. The reconstituted solution contains 5 mg. of 2-(ethylamino)-2-(2-thienyl)-cyclohexanone (free base equivalent) and 10 mg. of 4-(o-fluorophenyl)-6,8-dihydro-1,3,8-trimethylpyrazolo[3,4-e]-[1,4]diazepin-7(1H)-one (free base equivalent) per ml. If desired, a parenteral solution having different concentrations of active ingredients is obtained by reconsituting the freeze-dried formulation with any desired amount of water.

EXAMPLE 7

| Ingredient | Quantity |
| --- | --- |
| 2-(Ethylamino)-2-(2-thienyl)-cyclohexanone hydrochloride | 291 g. |
| 4-(o-Fluorophenyl)-6,8-dihydro-1,3,8-trimethylpyrazolo-[3,4-e][1,4]diazepin-7(1H)-one hydrochloride | 280 g. |
| Benzethonium chloride | 5 g. |
| Aminoacetic acid | 350 g. |
| 4% (weight/volume) Aqueous solution of citric acid, to make pH 3-4 | |
| Water for injection, to make 20 liters | |

The 2-(ethylamino)-2-(2-thienyl)cyclohexanone hydrochloride and the 4-(o-fluorophenyl)-6,8-dihydro-1,3,8-trimethylpyrazolo[3,4-e][1,4]diazepin-7(1H)-one hydrochloride are dissolved in 16.5 liters of water. The benzethonium chloride and the aminoacetic acid are then added separately and dissolved. The solution is adjusted to pH 3-4, if necessary, with citric acid solution and sufficient water is added to give a final volume of 20 liters. The solution is sterilized by filtering it through a sterile filter membrane, 0.22 micron pore size. The filtrate is aseptically filled in 2 ml. portions into glass vials having a capacity of 5 ml. which are then covered with sterile rubber stoppers suitable for use in freeze-drying operations. The solution in each vial is freeze-dried and the vials are sealed with aluminum seals. Yield equals approximately 10,000 vials. The product is a freeze-dried formulation. For use as a solution for parenteral administration, each vial is reconstituted with water for injection, to a volume of 5 ml. The reconstituted solution contains 5 mg. of 2-(ethylamino)-2-(2-thienyl)cyclohexanone (free base equivalent) and 5 mg. of 4-(o-fluorophenyl)-6,8-dihydro-1,3,8-trimethylpyrazolo[3,4-e][1,4]diazepin-7(1H)-one (free base equivalent) per ml.

I claim:

1. A pharmaceutical composition possessing anesthetic activity and suitable for parenteral administration, comprising, in combination, one part by weight of 2-(ethylamino)-2-(2-thienyl)cyclohexanone and 0.33 to 3 parts by weight of 4-(o-fluorophenyl)-6,8-dihydro-1,3,8-trimethylpyrazolo[3,4-e][1,4]diazepin-7(1H)-one.

2. The pharmaceutical composition of claim 1 wherein the 2-(ethylamino)-2-(2-thienyl)cyclohexanone and the 4-(o-fluorophenyl)-6,8-dihydro-1,3,8-trimethylpyrazolo[3,4-e][1,4]diazepin-7(1H)-one, are present in the form of acid-addition salts.

3. The pharmaceutical composition of claim 2 wherein the acid-addition salts are the hydrochlorides.

4. The pharmaceutical composition of claim 2 in the form of an aqueous solution for parenteral administration containing at least 2.5 mg. of 2-(ethylamino)-2-(2-thienyl)cyclohexanone per ml. of solution.

5. The pharmaceutical composition of claim 2 in the form of a freeze-dried formulation suitable for reconstitution with water to give an aqueous solution for parenteral administration containing at least 2.5 mg. of 2-(ethylamino)-2-(2-thienyl)cyclohexanone per ml. of solution.

6. A method for inducing anesthesia in mammals which comprises administering by a parenteral route, in combination, an anesthetically-effective quantity of one part by weight of 2-(ethylamino)-2-(2-thienyl)cyclohexanone and 0.33 to 3 parts by weight of 4-(o-fluorophenyl)-6,8-dihydro-1,3,8-trimethylpyrazolo[3,4-e][1,4]diazepin-7(1H)-one.

7. The method of claim 6 wherein the 2-(ethylamino)-2-(2-thienyl)cyclohexanone and the 4-(o-fluorophenyl)-6,8-dihydro-1,3,8-trimethylpyrazolo[3,4-e][1,4]diazepin-7(1H)-one are present in the form of acid-addition salts.

8. The method of claim 7 wherein the acid-addition salts are the hydrochlorides.

9. The method of claim 6 wherein the parenteral route is the intravenous route.

10. The method of claim 6 wherein the parenteral route is the intramuscular route.

* * * * *